(12) United States Patent  (10) Patent No.: US 7,027,845 B2
Sudo  (45) Date of Patent: Apr. 11, 2006

(54) HINGE DEVICE AND CELL PHONE USING THE HINGE DEVICE

(75) Inventor: Hiroshi Sudo, Tokyo (JP)

(73) Assignee: Ohashi Technica, Inc., Tokyo (JP)

( * ) Notice: Subject to any disclaimer, the term of this patent is extended or adjusted under 35 U.S.C. 154(b) by 0 days.

(21) Appl. No.: 10/492,838

(22) PCT Filed: Oct. 9, 2002

(86) PCT No.: PCT/JP02/10478

§ 371 (c)(1),
(2), (4) Date: Oct. 28, 2004

(87) PCT Pub. No.: WO03/036109

PCT Pub. Date: May 1, 2003

(65) Prior Publication Data

US 2005/0054394 A1    Mar. 10, 2005

(30) Foreign Application Priority Data

Oct. 19, 2001  (JP) ............................ 2001-322328

(51) Int. Cl.
*H04M 1/00* (2006.01)

(52) U.S. Cl. .................. 455/575.1; 455/347; 455/349; 455/351; 379/433.01; 379/433.13; 379/428.01

(58) Field of Classification Search .............. 455/90.2, 455/90.3, 575.1, 575.3, 347, 349, 351; 379/433.01, 379/433.13, 428.01, 428.02, 433.05, 433.12
See application file for complete search history.

(56) References Cited

U.S. PATENT DOCUMENTS 6,091,938 A * 7/2000 Go ........................... 455/575.3
6,115,620 A * 9/2000 Colonna et al. ......... 455/569.1
6,678,539 B1 * 1/2004 Lu ........................... 455/575.1
6,708,046 B1 * 3/2004 Takagi ..................... 455/575.3
6,766,180 B1 * 7/2004 Doraiswamy et al. ... 455/575.1
2001/0019946 A1 * 9/2001 Okuda ......................... 455/90

FOREIGN PATENT DOCUMENTS

EP    1 251 2860    10/2002
JP    10-224438    8/1998

(Continued)

*Primary Examiner*—Curtis Kuntz
*Assistant Examiner*—Tuan Pham
(74) *Attorney, Agent, or Firm*—Westerman, Hattori, Daniels & Adrian, LLP (57) ABSTRACT

An object of this invention is to provide a hinge device simple in structure, excellent is cost efficiency, and excellent in durability, and a cellular phone using the hinge device.

To attain this object, the hinge device includes a tubular member 5, a catch 3 which includes engagement projected parts 38 each having a convex surface with a specified radius of curvature formed thereon, a energizing means 4, and a disk 2 which includes engagement recessed parts 32 engaged with the engagement projected parts in regions opposed to the engagement projected parts 32 of the catch, respectively, and which is rotatably connected with the catch, each of the engagement recessed parts 32 having concave surfaces with a radius of curvature larger than the radius of curvature of the engagement recessed parts formed thereon. An engagement state in which the engagement projected parts 38 are engaged with the respective engagement recessed parts 32 is maintained by an energizing force of an energizing unit to fix the cover body section, whereas the engagement state is released by opening and closing the cover body section against the energizing force.

10 Claims, 5 Drawing Sheets

FOREIGN PATENT DOCUMENTS

| | | |
|---|---|---|
| JP | 2001-241254 | 9/2001 |
| JP | 2002-130250 | 5/2002 |
| JP | 2002-261466 | 9/2002 |
| JP | 2002-300242 | 10/2002 |

* cited by examiner

HINGE DEVICE AND CELL PHONE USING THE HINGE DEVICE

TECHNICAL FIELD

The present invention relates to a hinge device and a folding cellular phone using the hinge device.

BACKGROUND ART

In recent years, a folding cellular phone which has a sufficiently secured space as an operation part or a display part while it is used, and which folds and is convenient to carry when it is not used has spread as portable equipment. The folding cellular phone uses a hinge device between a cover body section (receiver section) that serves as a housing and a main body section (transmitter section) so that the cover body section is rotatably connected with the main body section. For portable equipment using the hinge device of this type, a fixing structure is adopted so as not to suddenly open or close the cover body section when the cover body section is expanded or closed.

Examples of the fixing structure include a structure in which the main body section and the cover body section are provided with magnets, respectively, and in which the cover body section is fixed by attractive forces of the magnets, and a structure in which a projected part and a recessed part are provided on butt faces of a fixing section and a rotation section, both of which function as a rotation mechanism of the hinge device, respectively, the projected part and the recessed part are engaged with each other at a specified angle, and in which the phone is fixed while the cover body section is opened at the specified angle.

If a method of including the magnets in the cover body section and the main body section is used, the conventional hinge structure has a disadvantage in terms of a constraint or a weight when the hinge device is implemented to the housing that is formed compact. In addition, if a structure of fixing the cover body section to the hinge mechanism itself is provided, the hinge mechanism is disadvantageously complicated and a care need to be disadvantageously taken for durability, i.e., measures against a wear following opening and closing of the cover body section needs to be considered.

The present invention has been achieved in light of the conventional disadvantages. It is an object of the present invention to provide a hinge device simple in structure, excellent in cost efficiency, and excellent in durability, and a cellular phone using the hinge device.

DISCLOSURE OF THE INVENTION

Figure 1:
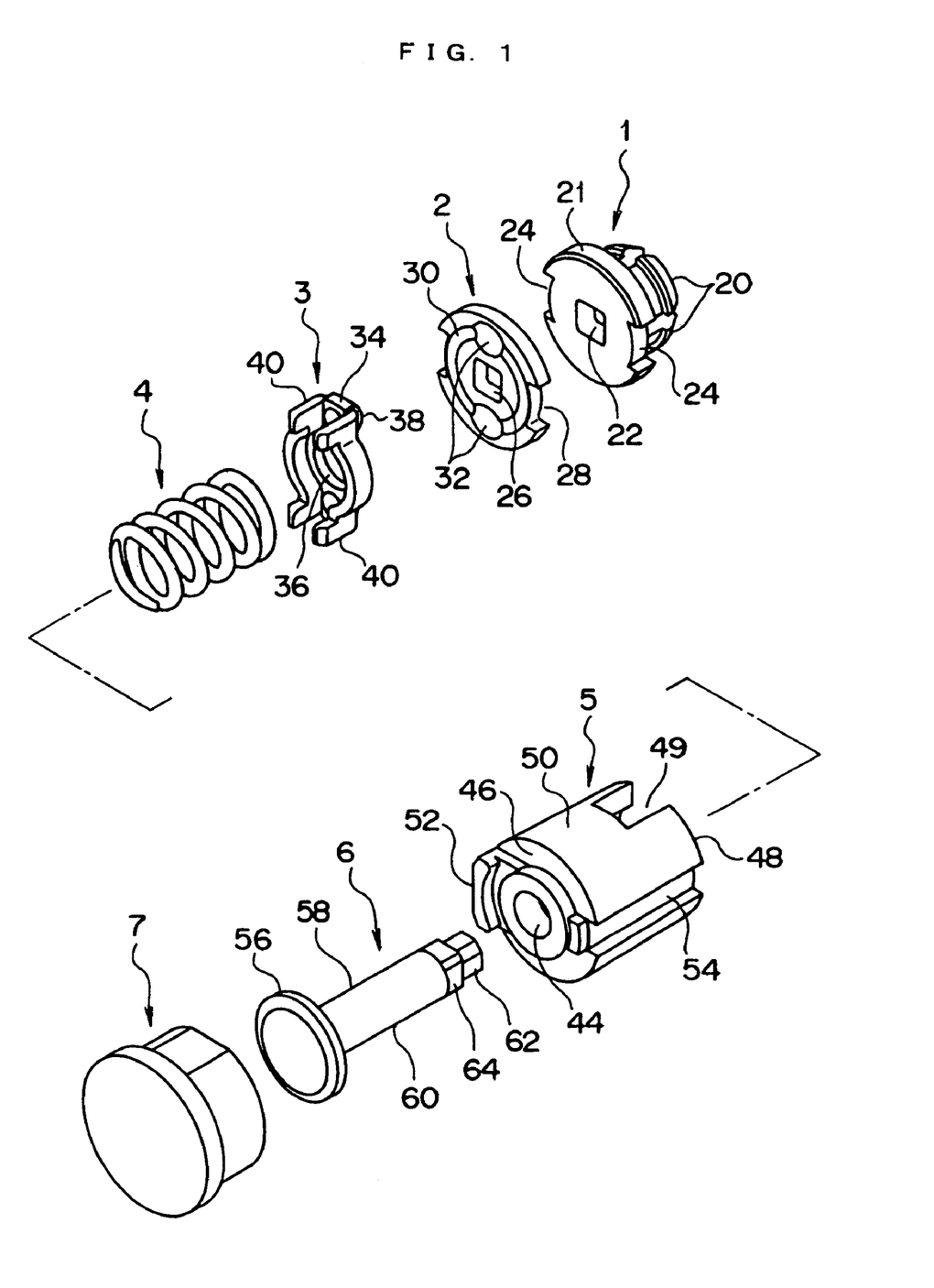
FIG. 1 is an exploded perspective view of a hinge device according to one embodiment of the present invention.
Figure 5:
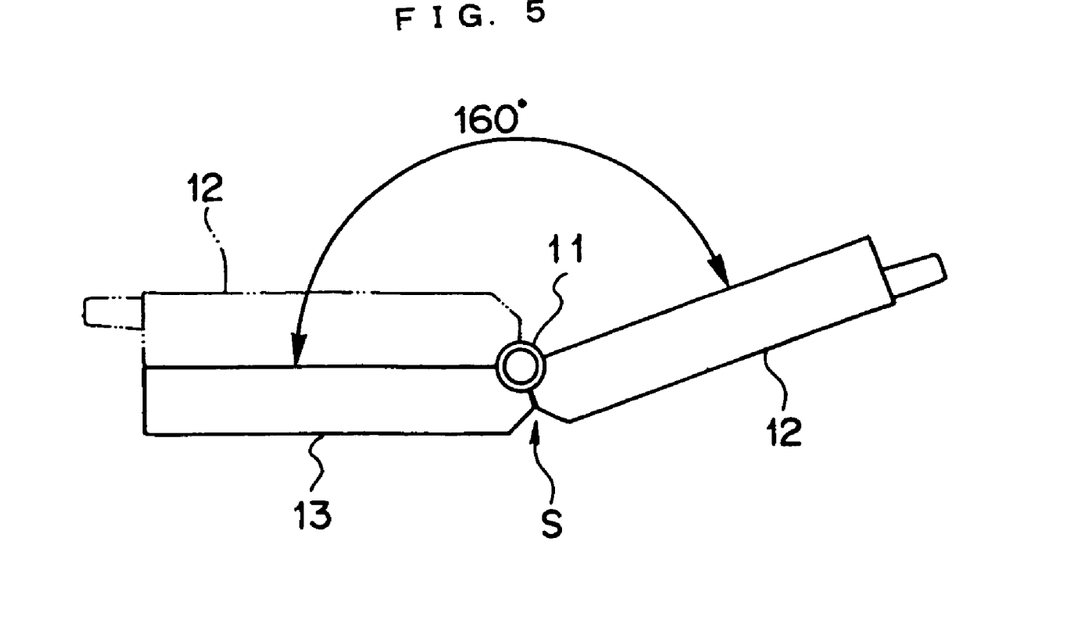
FIG. 5 depicts a cellular phone using the hinge device according to the embodiment.

In order to solve the technical disadvantages, as shown in FIGS. 1 and 5, the present invention provides a hinge device for rotatably connecting a main body section with a cover body section, comprising: a tubular member 5 having a bottom formed on one end; a catch 3 slidably fitted into the other end of the tubular member in an axial direction, and including engagement projected parts 38 each having a convex surface with a specified radius of curvature formed thereon, the engagement projected parts 38 provided at positions symmetric about a center of a surface portion perpendicular to the axial direction, respectively; energizing means 4, contained in the tubular member, for energizing the catch; and a disk 2 having engagement recessed parts 32, which are provided in regions opposed to the respective engagement projected parts of the catch, and which are engaged with the respective engagement projected parts, and rotatably connected with the catch, each of the engagement recessed parts 32 having concave surfaces with a radius of curvature larger than the radius of curvature of the engagement projected parts formed thereon, wherein at a closed position of the cover body section 12 and at a position at which expansion of the cover body section is restricted to 180 degrees or less, an engagement state in which the engagement projected parts 38 are engaged with the engagement recessed parts 32, respectively, is maintained to fix the cover body section by an energizing force of the energizing member, and the engagement state is released by opening and closing operations of the cover body section against the energizing force.

The expression "having concave surfaces with a radius of curvature larger than the radius of curvature of the engagement projected parts formed thereon" means as follows. The convex surfaces of the engagement convex parts 38 and the concave surfaces of the engagement concave surfaces 32 do not always have constant radii of curvature. However, the maximum radius of curvature of the convex surface is larger than the maximum radius of curvature of the concave surface.

Further, the hinge device according to the present invention is constituted so that each of the engagement projected parts 38 has a convex surface with a radius of R3 formed thereon, and each of the engagement recessed parts 32 has concave surfaces with a radius of R1 in a cross section in a central line direction of the disk 2 and a radius of R2 in a cross section orthogonal to the central line direction, respectively, and so that the respective radii satisfy a relationship of R2>R1>R3.

The hinge device according to the present invention is constituted to further comprise a hook 1 rotating integrally with the disk 2, and having a plurality of stopper claws, and so that the tubular member 5 having the bottom contacted with a head of a shaft body 6 having the head on one end, the energizing means 4 comprised of a coil spring, and the catch 3 are rotatably inserted into the shaft body, and the disk 2 and the hook 1 are fitted into the shaft body 6 while integrally rotating with the shaft body 6, and so that the tubular member 5 is fixed to one side of the main body section 13 or the cover body section 12, whereas the hook 1 is stopped on the other side of the main body section 13 or the cover body section 12 and the disk 2 is fixedly fitted into the other side of the main body section 13 or the cover body section 12.

The hinge device according to the present invention, the shaft body 6 is constituted so that a first rectangular shaft portion 62 having a rectangular cross section is formed on a tip end of the shaft body opposite to the head, a second rectangular shaft portion 64 thicker than the first rectangular shaft portion is formed inside of the shaft body, and the disk 2 and the hook 1 are inserted into the second rectangular shaft portion 64 and the first rectangular shaft portion 62, respectively.

The hinge device according to the present invention is constituted so that expansion of the cover body section 12 is stopped halfway along entry of the engagement projected parts of the catch 3 into the respective engagement recessed parts of the disk 2.

The hinge device according to the present invention is constituted so that a stopper mechanism provided between the main body section 13 and the cover body section 12 stops the expansion of the cover body section 12 at an expansion angle between 150 degrees and 170 degrees.

The hinge device according to the present invention is constituted so that the cover body section 12 is closed halfway along entry of the engagement projected parts 38 of the catch 3 into the respective engagement recessed parts 32 of the disk 2.

A cellular phone according to the present invention is constituted so that any one of the above-stated hinge devices is attached between the main body section 13 including a transmitter section and the like and the cover body section 12 including a receiver section and the like, a stopper mechanism is provided so that the cover body section 12 is stopped at an expansion angle between 150 degrees and 170 degrees, and so that the main body section 13 and the cover body section 12 are rotatably connected with each other.

BEST MODE FOR CARRYING OUT THE INVENTION

An embodiment of the present invention will be described hereinafter with reference to the drawings.

Figure 2:
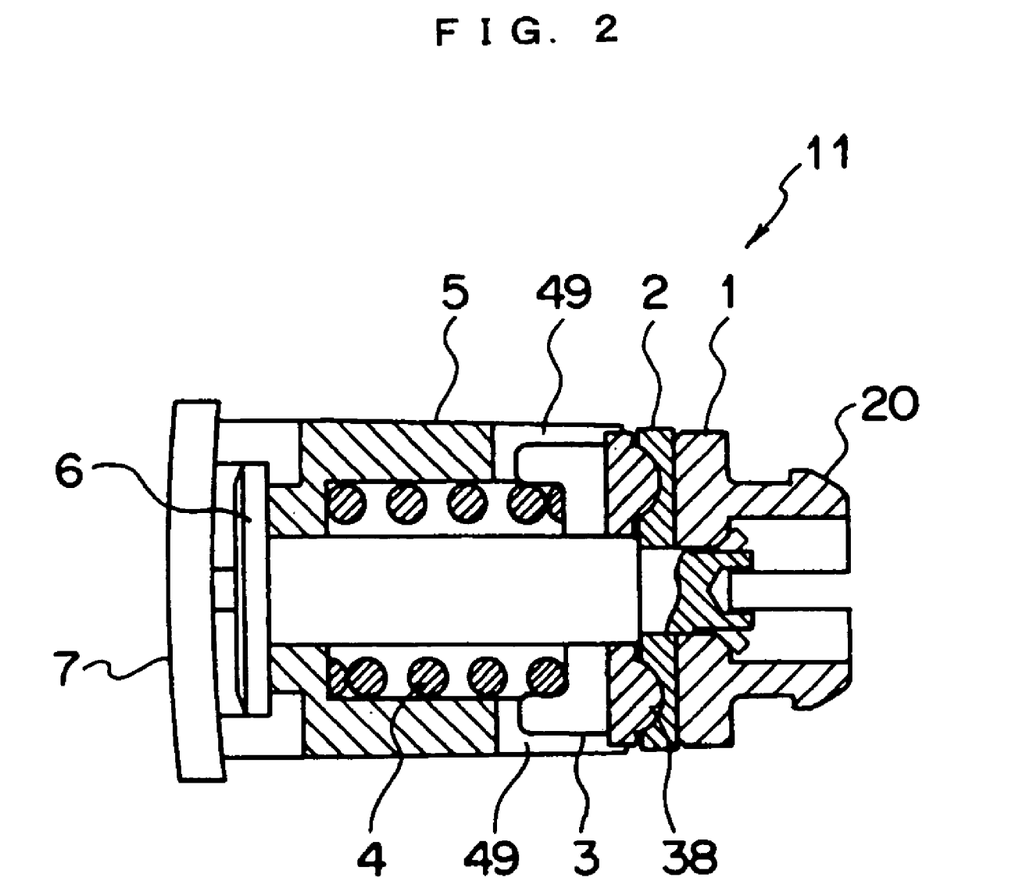
FIG. 2 is a sectional view of the hinge device according to the embodiment.

FIG. 1 is an exploded perspective view of a hinge device 11 used in a portable equipment such as a folding cellular phone. This hinge device 11 includes, as constituent elements, a hook 1, a disk 2, a catch 3, a coil spring 4, a tubular member 5, a shaft body 6, and a cover 7. Among the constituent elements, the disk 2 and the catch 3 mainly constitute a cam mechanism. An outside of this hinge device 11 is comprised of the hook 1, the disk 2, the tubular member 5, and the cover 7 as shown in FIG. 2.

The hook 1 and the tubular member 5 are each made of synthetic resin such as ABS or POM, or a material formed by sintering or MIM (metal injection molding). The cover is made of synthetic resin such as ABS or POM, the shaft body 6 is made of metal such as aluminum or a steel product, and the coil spring 4 is made of a steel product. It is preferable that the disk 2, the catch 3, and the shaft body 6 are subjected to a surface treatment such as electroless Ni plating or Ni plating.

The respective constituent elements will next be described. As shown in FIG. 1, the hook 1 has four stopper claws 20 formed outward of a substrate 20, and a rectangular hole 22 formed in a central portion of a substrate 21. The hook 1 has also fitting grooves 24 in left and right regions on an outer surface of the substrate 21, respectively.

Figure 3:
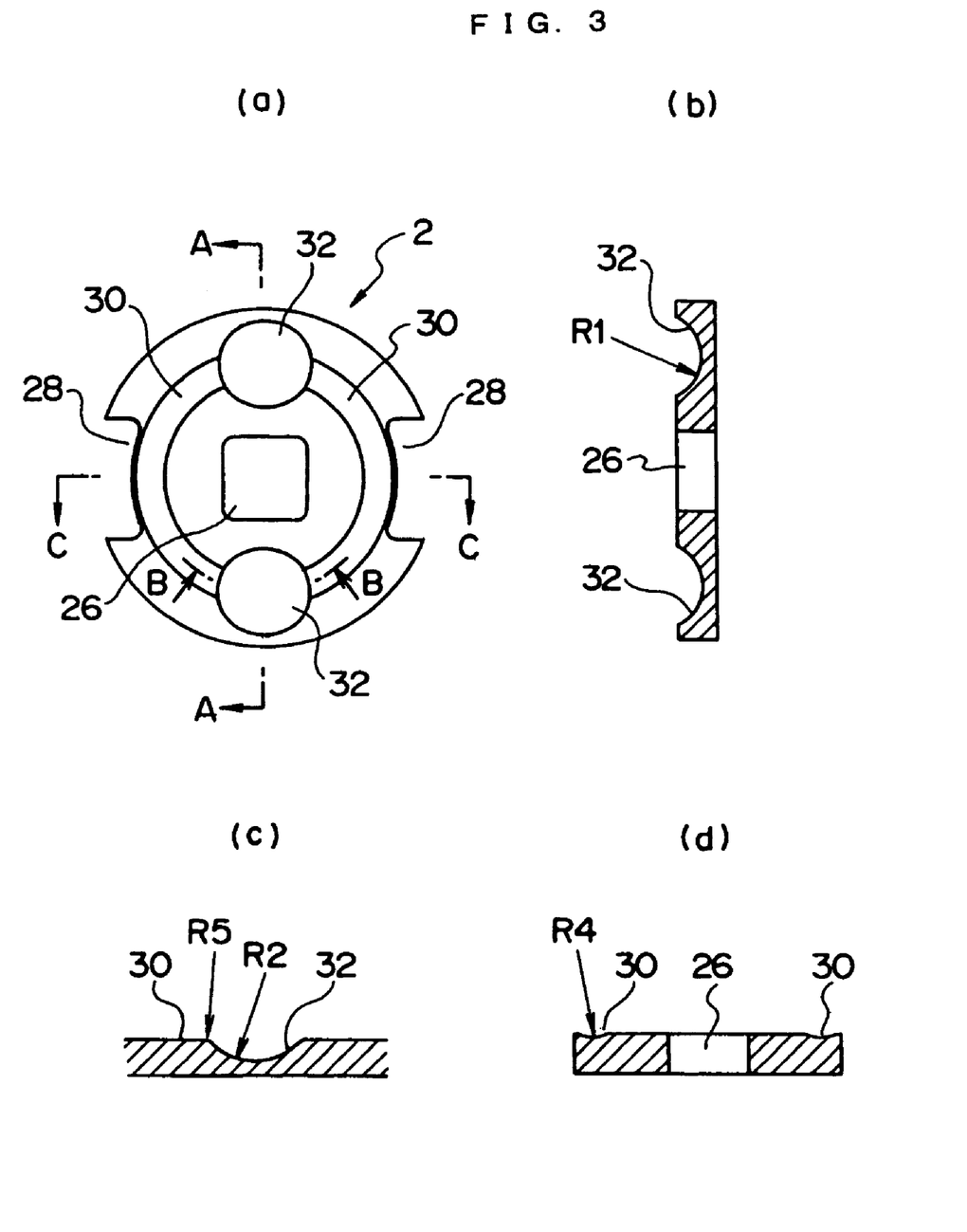
FIG. 3(a) is a left side view of a disk in the hinge device.
FIG. 3(b) is a cross-sectional view of the disk taken along a line A—A.
FIG. 3(c) is a cross-sectional view of the disk taken along a line B—B.
FIG. 3(d) is a cross-sectional view of the disk taken along a line C—C.

As shown in FIG. 3, the disk 2 has a rectangular hole 26 provided in a central portion of a disk-like base, and fitting grooves 28 provided in left and right regions of the base, respectively. An annular shallow groove-like guide path 30 is formed on an outer surface of the disk-like base, and engagement recessed parts 32 are formed in upper and lower regions of this guide path 30, respectively. The two engagement recessed parts 32 are arranged symmetrically about a center of the disk 2.

Each of the engagement recessed parts 32 is formed such that a radius R2 of a concave surface in a cross section of the disk 2 taken along a line A—A (FIG. 3(b)) in a circumferential direction of the disk 2 is larger than a radius R1 of a convex surface in a cross section of the disk 2 (FIG. 3(c)) taken along a line B—B orthogonal to the circumferential direction of the disk 2. Further, the radius R1 in the line A—A cross section is formed larger than a radius R3 of a concave surface of an engagement projected part 38 of the catch 3 to be described later. Accordingly, the magnitudes of the respective radii satisfy a relationship of R2>R1>R3. This relationship enables the engagement projected parts 38 of the catch 3 to smoothly enter or escape from the concave surfaces of the respective engagement recessed parts 32 of the disk 2. In addition, an energizing force of the coil spring 4 during the entry and escape of the catch 3 enables imparting an appropriate opening and closing torque to the cover member 12. Further, since each engagement projected part 38 is small in contact area by which the engagement projected part 38 contacts with the engagement recessed part 32, the engagement projected part 38 can smoothly move. The reason of setting the radii of the respective surfaces constant is to facilitate working and to stabilize function.

A corner, in which the engagement projected parts 38 of the catch 3 enter the engagement recessed parts 32 from the guide path 30, is formed to have a projected round having a radius of R5 that is a half of the radius R2 or less. A groove of the guide path 30 is formed such that a cross section of the disk 2 taken along a line C—C (FIG. 3(c)) orthogonal to a direction of the groove is a recessed face having a radius R4. The radius R4 is equal to the radius R1 in the line A—A cross section. Alternatively, the concave surface of each engagement recessed part 32 in the line B—B cross section of the disk 2 (FIG. 3(c)) may not be always formed to have the constant radius R2 but may be formed, for example, such that a radius of the concave surface near a region in which the engagement projected part 38 enters (a region farther than the central portion of the engagement recessed part 32) is partially smaller than the radius R2. If so setting, a gradient at which the engagement projected part 38 enters the engagement recessed part 32 is sharp, thereby intensifying a torque applied to the cover body section 12.

Figure 4:
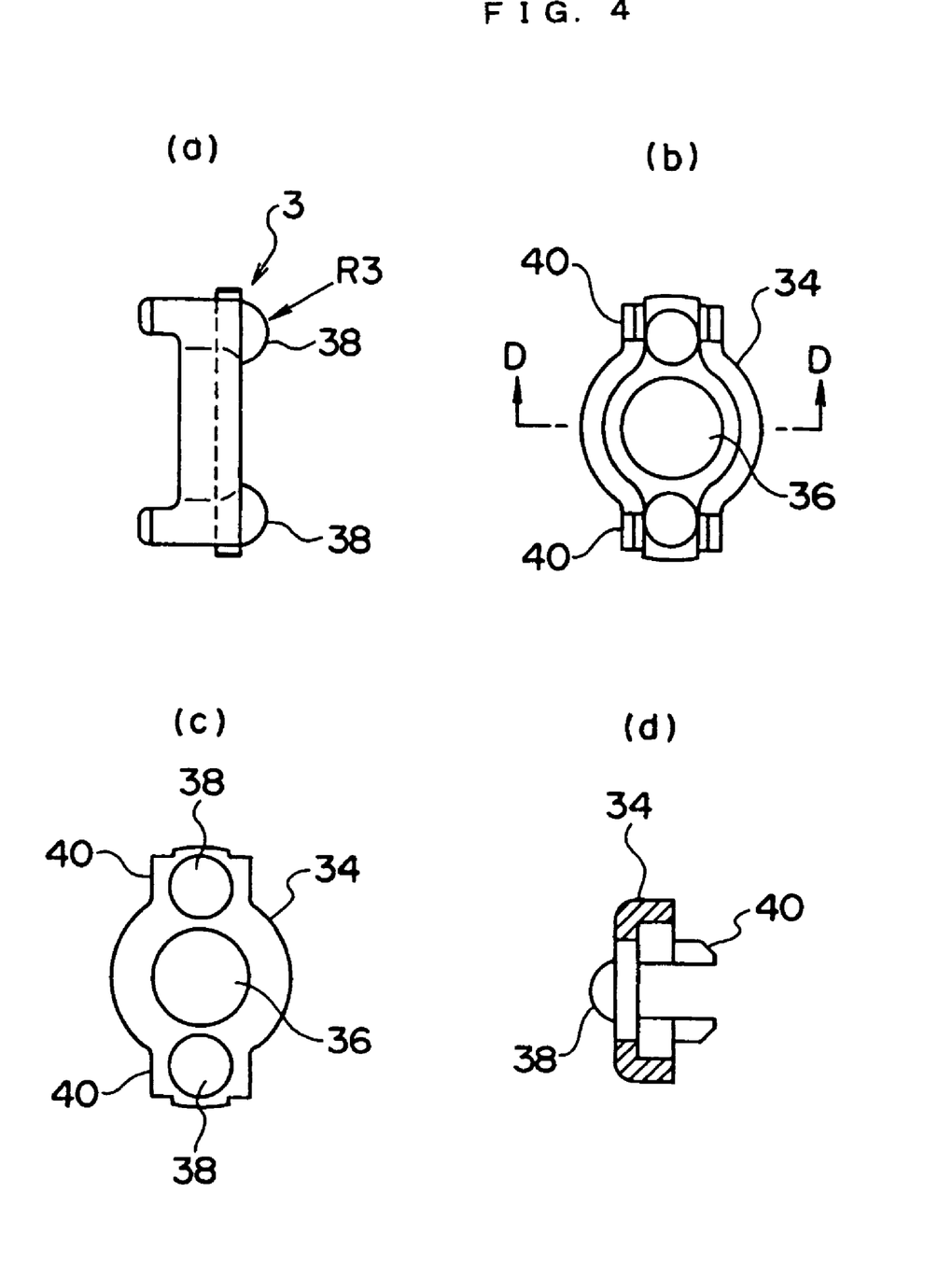
FIG. 4(a) is a front view of a catch in the hinge device.
FIG. 4(b) is a left side view of the catch.
FIG. 4(c) is a right side view of the catch.
FIG. 4(d) is a cross-sectional view of the catch taken along a line D—D.

FIG. 4 depicts the catch 3. The catch 3 shown therein is formed so that a plate piece is bent to have an inverted U-shaped cross section. A circular hole 36 is formed at a center of a substrate 34. The engagement projected parts 38 protruding outward are formed in upper and lower regions of the catch 3, between which this hole 36 is held, respectively. Each of the engagement projected parts 38 is formed into a hemisphere having the radius R3. The two engagement projected parts 38 are arranged symmetrically about a rotational center of the catch 3. Further, fitting portions 40 are formed in upper and lower bent regions of the catch 3, respectively, and are fitted into fitting recessed parts 49 of the tubular member 5 to be described later, respectively.

The coil spring 4 is a compression spring and energizes the catch 3. As shown in FIG. 1, the tubular member 5 is a tubular container that has a bottom 46 having a through hole 44 provided in a central portion, formed on one end, and that has an opening 48 formed on the other end. The fitting recessed parts 49, cut in parallel to an axial direction of the tubular member 5, are provided in upper and lower regions of this opening 48, respectively. In addition, a cylinder part 50 of the tubular member 5 has a flat wall surface 52 formed in one of left and right portions, and an engagement groove 54 in parallel to the axial direction formed in the other one of the left and right portions.

As shown in FIG. 1, the shaft body 6 is comprised of a tubular head 56 and a shaft 58. This shaft 58 has a circular shaft portion 60 having a circular cross section formed in regions other than a tip end of the shaft 58, a first rectangular shaft portion 62 having a rectangular cross section formed on the tip end, and a second rectangular shaft portion 64 formed inside. This second rectangular shaft portion 64 is formed to be slightly thicker than the first rectangular shaft portion 62. The first rectangular shaft portion 62 is fitted into the rectangular hole 22 of the hook 1, whereas the second rectangular shaft portion 64 is fitted into the rectangular hole 26 of the disk 2. The cover 7 is a cap-like member.

As shown in FIG. 2, in the hinge device 11, the coil spring 4 is contained in the tubular member 5. While the other end of this coil spring 4 is kept in contact with the catch 3, the fitting parts 40 of the catch 3 are fitted into the respective fitting recessed parts 49 of the tubular member 5. Each of the fitting recessed parts 49 is notched to have a constant width, and the fitting portions 40 of the catch 3 are movable in the axial direction.

The shaft 58 of the shaft body 6 is inserted into the tubular member 5 from the through hole 44 at the bottom 46 of the tubular member 5, and the coil spring 4 and the catch 3 are inserted into the tubular member 5. While the disk 2 is pressed against the catch 3, the second rectangular shaft portion 64 is inserted into the rectangular hole 26 of the disk 2, and the rectangular hole 22 of the hook 1 is fitted into the first rectangular shaft portion 62 on the tip end of the shaft body 6. Finally, a tip end of the first rectangular shaft portion 62 protruding from the hook 1 is crimped. The hinge device is thus assembled.

In this state, the rectangular hole 26 of the disk 2 and the rectangular hole 22 of the hook 1 are fitted into the respective rectangular shaft portions 62 and 64 of the shaft body 6. The disk 2 and the hook 1 thereby rotate integrally with the shaft body 6. The through hole 44 of the tubular member 5 and the hole 36 of the catch 3 are inserted into the circular shaft 60 of the shaft body 6. For this reason, the tubular member 5 and the catch 3 are free relative to the rotation of the shaft body 6. Further, the catch 3 is fitted into the fitting recessed parts 49 of the tubular member 5, whereby the catch 3 rotates integrally with the tubular member 5.

The disk 2 and the catch 3 constitute the cam structure in the following fashion. The catch 3 is constantly energized by the coil spring 4 in a direction of the disk 2. Following the rotation of the disk 2, the engagement projected parts 38 of the catch 3 repeatedly enter and escape from the respective engagement recessed parts 32 of the disk 2. In this hinge device, therefore, the disk 2 and the hook 1 rotate relative to the tubular member 5 through the cam mechanism.

As shown in FIG. 5, a folding cellular phone includes a cover body section 12 comprised of a receiver section provided with a display screen and the like, and a main body section 13 comprised of a transmitter section provided with an operation key ad the like. To attach the hinge device 11 to this cellular phone, the stopper claws 20 of the hook 1 in the hinge device 11 are stopped by hinge attachment holes provided in the cover body section 11 of the cellular phone, respectively, and the disk 2 is fixedly fitted into the cellular phone. Further, the wall surface 52 and the engagement groove 54 of the tubular member 5 are fixedly fitted into left and right regions of a hinge attachment tubular section provided on the main body section 13, respectively. Normally, two hinge devices are attached to a connecting section in which the main body section 13 is connected to the cover body section 12.

A basic operation of the hinge device will now be described. The two engagement recessed parts 32 provided on the disk 2 and the two engagement projected parts 38 provided on the catch 3 are arranged to be away from each other at an angle of 180 degrees against centers of the disk 2 and the catch 3, respectively. Therefore, if the engagement projected parts 38 are engaged with the central portions of the respective engagement recessed parts 32, a rotation angle formed between the disk 2 and the catch 3 is 180 degrees.

In this embodiment, however, the hinge device is constituted so that the closing or extension of the cover body section 12 is finished halfway along the entry of the engagement projected parts 38 into the respective engagement recessed parts 32 and the moving thereof toward central portions of the respective engagement recessed parts 32, and the entry of the engagement projected parts 38 is stopped. At this time, a function of moving the engagement projected parts 38 sliding into the engagement recessed parts 32 halfway to the central portions of the engagement recessed parts 32 is generated by the energizing force of the coil spring 4. As a result, a specified torque is applied to the cover body section 12.

Figure 6:
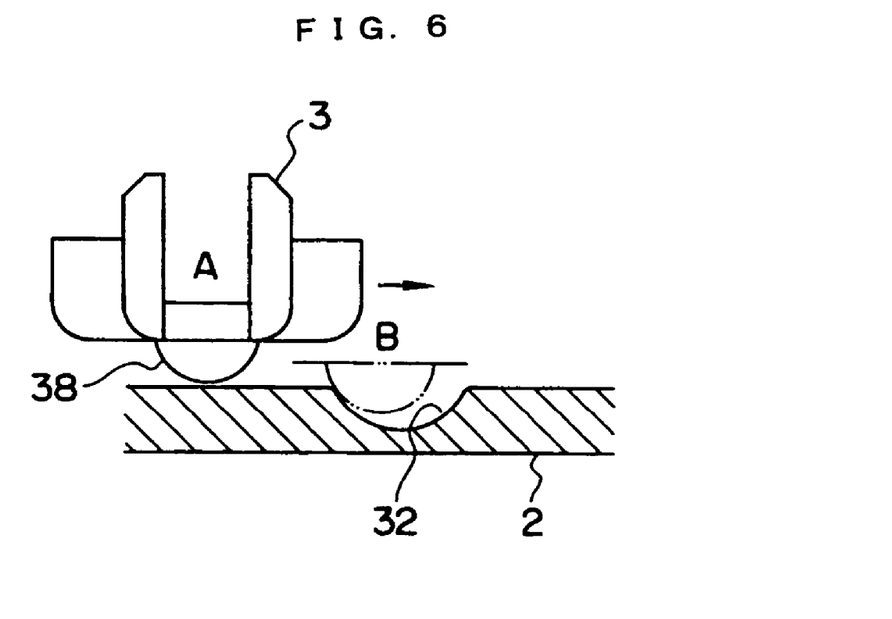
FIG. 6 is an explanatory view for an engagement state between the catch and the disk.

That is, the hinge device 11 is attached to the cellular phone shown in FIG. 5 in the following manner. As shown in FIG. 6, the engagement projected part 38(A) moving following the operation of the cover body section 12 starts entering the engagement recessed part 32 just before the cover body section 12 is closed. While the cover body section 12 is closed, the entry of the engagement projected part 38 is stopped (at a position of B) halfway. Further, when the cover body section 12 is expanded and an expansion angle of the cover body section 12 is, for example, 160 degrees, then the engagement projected part 38 that has escaped from the engagement recessed part 32 starts entering the other engagement recessed part 32. While the engagement projected part 38 is moving toward the central portion of the engagement recessed part 32, the entry of the engagement projected part 38 is stopped (at the position of B). Further, a mechanism of a stopper S is provided so that an end portion of the main body section 13 and that of the cover body section 12 contact each other at a position at which the expansion angle is 160 degrees, and so that the expansion of the cover body section 12 is stopped.

If the hinge device 11 is constituted so that the entry of the engagement projected parts 38 is halted halfway during the closing and the expansion of the cover body section 12, a force for allowing the engagement projected parts 38 to further move toward the central portions of the respective engagement recessed parts is generated by the energizing force of the coil spring 4. Therefore, even while the cover body section 12 is closed, the torque is applied to the cover body section 12 in a direction in which the cover body section 12 is closed. Thus, the cover body section 12 is not shaky and does not suddenly open, thereby stably maintaining the cover body section 12 in a closed state.

Even if the expansion of the cover body section 12 is finished (at the angle of 160 degrees) and the cover body section 12 is stopped, the engagement projected parts 38 are stopped halfway along the entry thereof into the respective engagement recessed parts 32. As a result, the cover body section 12 is set in a state in which the cover body section 12 is energized in an expansion direction. Therefore, the cover body section 12 is not shaky but stably fixed. Furthermore, the hinge device 11 is constituted so that the engagement projected parts 38 slide only on the concave surfaces of the engagement recessed parts 32, and is not constituted so that the engagement projected parts 38 directly contact with the respective engagement recessed parts 32 to thereby restrict the rotation of the cover body section 12. Thus, the structure of the hinge device 11 is free from concerns such as deterioration of the function of the hinge device 11 caused by the consumption of these members, and is excellent in durability.

In the embodiment, the stopper S mechanism is constituted so that the cover body section 12 stops expanding at the position at which the expansion angle is 160 degrees. However, the expansion angle is not limited to 160 degrees but may be reduced or increased according to the radius R2 of the engagement recessed parts 32 and the like. This expansion angle may be 180 degrees or less. It is, however, preferable hat the expansion angle falls within a range of 150 to 170 degrees so as to secure an appropriate torque for fixing the cover body section 12. If the expansion angle is 150 degrees or less, the radius R2 of each engagement recessed part 32 is excessively large and a sufficient torque cannot be obtained. If the expansion angle is 170 degrees or more, the engagement projected part 38 enters the engagement recessed part 32 too deeply. As a result, the gradient of the concave surface is gentler, making it impossible to obtain the sufficient torque.

Meanwhile, in the cellular phone to which the hinge device is attached, when the cover body section 12 is opened manually, the cam mechanism operates and the disk 2 (hook 1) rotates together with the cover body section 12. Following the rotation of the disk 2, each engagement projected part 38 of the catch 3 is disengaged from one engagement recessed part 32 of the disk 2 and slides on the guide path 30 of the disk 2. While the engagement projected part 38 escapes from the one engagement recessed part 32, the specified torque is applied to the cover body section 12. The cover body section is opened against this specified torque. When the expansion of the cover body section 12 is finished, the engagement projected part 38 of the catch 3 enters and is engaged with the other engagement recessed part 32 of the disk 2.

During the operation, the stopper S mechanism functions halfway along the entry of the engagement projected parts 38 of the catch 3 into the respective engagement recessed parts 32 of the disk 2, thereby stopping the expansion of the cover body section 12. When the expansion of the cover body section 12 is finished, an impetus is added to the cover body section 12 by the energizing force of the coil spring 4. Thus, a sense of clicking is given to the opening operation, and a sense of modulation is given to the expansion of the cover body section 12.

If the cover body section 12 is to be closed, the cover body section 12 is closed against the torque applied to the cover body section 12 similarly to the opening operation. Following the closing and moving of the cover body section 12, the disk 2 rotates, the engagement projected parts 38 of the catch 3 are disengaged from the respective engagement recessed parts 32 of the disk 2 and slide on the guide path 30. Simultaneously with the closing of the cover body section 12, the engagement projected parts 38 are engaged with the original engagement recessed parts 32, respectively. At this moment, similarly to the opening operation, an impetus is intensified when the engagement projected parts 38 slide into the concave surfaces of the engagement recessed parts 32, thereby giving the sense of clicking to the closing operation.

Therefore, the cellular phone using the hinge device 11 according to the embodiment is constituted so that the disk that constitutes the cam mechanism is provided with the engagement recessed parts each having the concave surfaces and so that the catch that also constitutes the cam mechanism is provided with the engagement projected parts each having the convex surfaces. Consequently, it is possible to attain the hinge device small in the number of components and simple in structure, to thereby facilitate manufacturing and ensure excellent cost efficiency. Further, the cellular phone is constituted so that the cover body section is fixed by means of both the engagement of the spherical surfaces and the stopper mechanism. Therefore, the hinge device is excellent in durability. Besides, the sense of clicking is given to the opening and closing operations of the cover body section, and the sense of modulation can be advantageously given to the opening and closing operations of the cover body section.

As stated so far, the hinge device according to the present invention adopts the structure in which the hinge device includes the catch that includes the engagement projected parts and the disk that includes a pair of engagement recessed parts engaged with the respective engagement projected parts and each having the concave surfaces formed thereon to have a larger radius of curvature than those of the engagement projected parts, and that is rotatably connected with the catch, and in which the cover body section is fixed by keeping the engagement state between the engagement projected parts and the engagement recessed parts. Therefore, the hinge device exhibits advantages of a simple structure with a small number of components, excellent cost efficiency, excellent durability, and giving the sense of clicking to the opening and closing operations of the cover body section.

Furthermore, the hinge device according to the present invention adopts the structure in which the engagement projected parts have convex surfaces with the radius of R2 formed thereon, each of the engagement recessed parts has the concave surface with the radius of R1 and has the concave surface with the radius of R2 in the cross section orthogonal to that with the radius of R1, and in which the respective radii satisfy the relationship of R2>R1>R3. Therefore, the engagement projected parts of the catch can smoothly enter and escape from the respective engagement recessed parts of the disk, and the appropriate opening and closing torque can be applied to the cover body section by energizing means. Besides, the radii of the respective spherical surfaces are set constant, thereby advantageously facilitating working and stabilizing function.

The cellular phone according to the present invention adopts the structure in which the stopper mechanism is provided so as to stop the expansion of the cover body section with the expansion angle of the cover body section with respect to the main body section set between 150 degrees and 170 degrees. Therefore, the cellular phone according to the present invention exhibits the advantages of the simple structure with a small number of components and excellent cost efficiency. Besides, the cellular phone is constituted so as to fix the cover body section by means of both the engagement of the spherical surfaces and the stopper mechanism. Therefore, the cellular phone is excellent in durability. Moreover, since the sufficient torque is applied during the opening and closing of the cover body section, the sense of clicking and the sense of modulation are advantageously given to the opening and closing of the cover body section.

The invention claimed is:

1. A hinge of the mobile phone device for rotatably connecting a main body section with a cover body section, comprising:
    a tubular member having a bottom formed on one end;
    a catch slidably fitted into the other end of the tubular member in an axial direction, and including engagement projected parts each having a convex surface with a specified radius of curvature formed thereon, the engagement projected parts provided at positions symmetric about a center of a surface portion perpendicular to the axial direction, respectively;
    energizing means, contained in the tubular member, for energizing the catch; and
    a disk having engagement recessed parts, which are provided in regions opposed to the respective engagement projected parts of the catch, and which are engaged with the respective engagement projected parts, and rotatably connected with the catch, each of the engagement recessed parts having concave surfaces with a radius of curvature larger than the radius of curvature of the engagement projected parts having concave surfaces with a radius of curvature larger than the radius of curvature of the engagement projected parts formed thereon, wherein
    at a closed position of the cover body section and at a position at which expansion of the cover body section is restricted to 180 degrees or less, an engagement state in which the engagement projected parts are engaged with the engagement recessed parts, respectively, is maintained to fix the cover body section by an energizing force of the energizing member, and the engagement state is released by opening and closing operations of the cover body section against the energizing force.

2. The hinge device according to claim 1, wherein each of the engagement projected parts has a convex surface with a radius of R3 formed thereon, and each of the engagement recessed parts has concave surfaces with a radius of R1 in a cross section in a central line direction of the disk and a radius of R2 in a cross section orthogonal to the central line direction, respectively, and the respective radii satisfy a relationship of: $R2>R1>R3$.

3. The hinge device according to claim 1, further comprising:
    a hook rotating integrally with the disk, and having a plurality of stopper claws, wherein
    the tubular member having the bottom contacted with a head of a shaft body having the head on one end, the energizing means comprised of a coil spring, and the catch are rotatably inserted into the shaft body, and the disk and the hook are fitted into the shaft body while integrally rotating with the shaft body, and
    the tubular member is fixed to one side of the main body section or the cover body section, whereas the hook is stopped on the other side of the main body section or the cover body section and the disk is fixedly fitted into the other side of the main body section or the cover body section.

4. The hinge device according to claim 2, further comprising:
    a hook rotating integrally with the disk, and having a plurality of stopper claws, wherein
    the tubular member having the bottom contacted with a head of a shaft body having the head on one end, the energizing means comprised of a coil spring, and the catch are rotatably inserted into the shaft body, and the disk and the hook are fitted into the shaft body while integrally rotating with the shaft body, and
    the tubular member is fixed to one side of the main body section or the cover body section, whereas the hook is stopped on the other side of the main body section or the cover body section and the disk is fixedly fitted into the other side of the main body section or the cover body section.

5. The hinge device according to claim 4, wherein a first rectangular shaft portion having a rectangular cross section is formed on a tip end of the shaft body opposite to the head, a second rectangular shaft portion thicker than the first rectangular shaft portion is formed inside of the shaft body, and the disk and the hook are inserted into the second rectangular shaft portion and the first rectangular shaft portion, respectively.

6. The hinge device according to claim 1, wherein expansion of the cover body section is stopped halfway along entry of the engagement projected parts of the catch into the respective engagement recessed parts of the disk.

7. The hinge device according to claim 6, wherein a stopper mechanism provided between the main body section and the cover body section stops the expansion of the cover body section at an expansion angle between 150 degrees and 170 degrees.

8. The hinge device according to claim 1, wherein the cover body section is closed halfway along entry of the engagement projected parts of the catch into the respective engagement recessed parts of the disk.

9. A cellular phone, wherein the hinge device according to claim 3 is attached between the main body section including a transmitter section and the like and the cover body section including a receiver section and the like, a stopper mechanism is provided so that the cover body section is stopped at an expansion angle between 150 degrees and 170 degrees, and wherein the main body section and the cover body section are rotatably connected with each other.

10. A cellular phone wherein the hinge device according to claim 4 is attached between the main body section including a transmitter section and the like and the cover body section including a receiver section and the like, a stopper mechanism is provided so that the cover body section is stopped at an expansion angle between 150 degrees and 170 degrees, and wherein the main body section and the cover body section are rotatably connected with each other.

* * * * *